Nov. 12, 1935. J. W. WHITE 2,021,039
DEVICE FOR THE HANDLING OF BULK MATERIAL
Filed Oct. 5, 1934 3 Sheets-Sheet 3
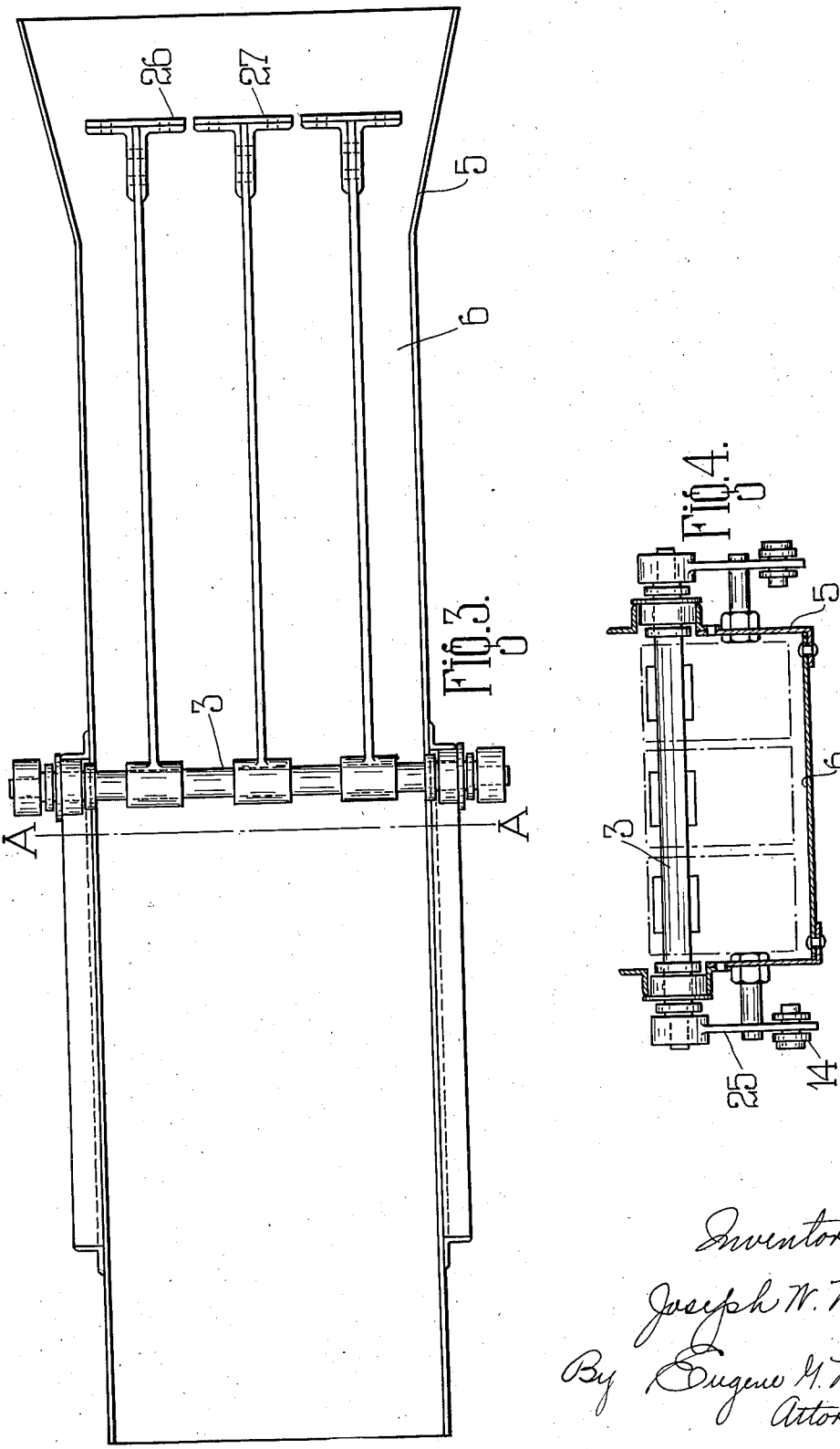

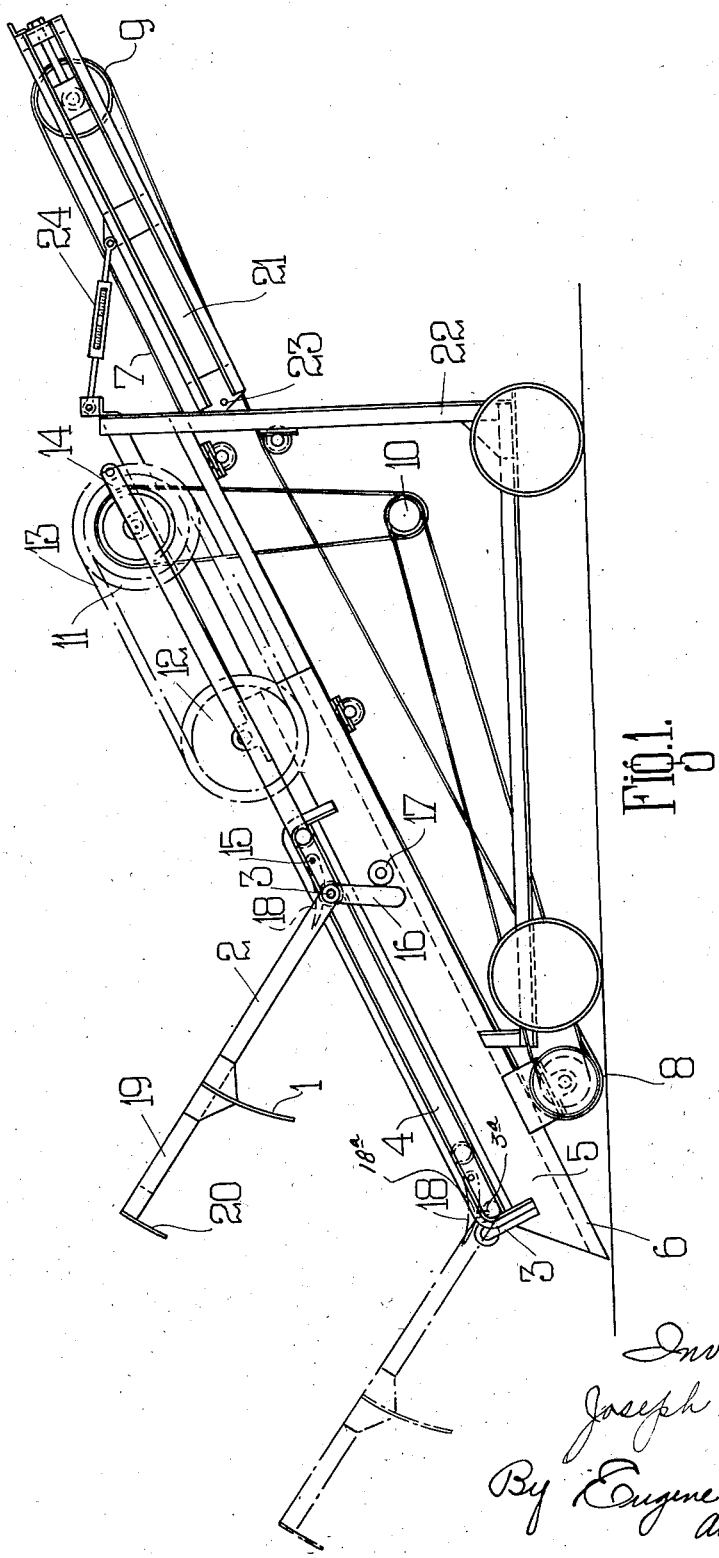

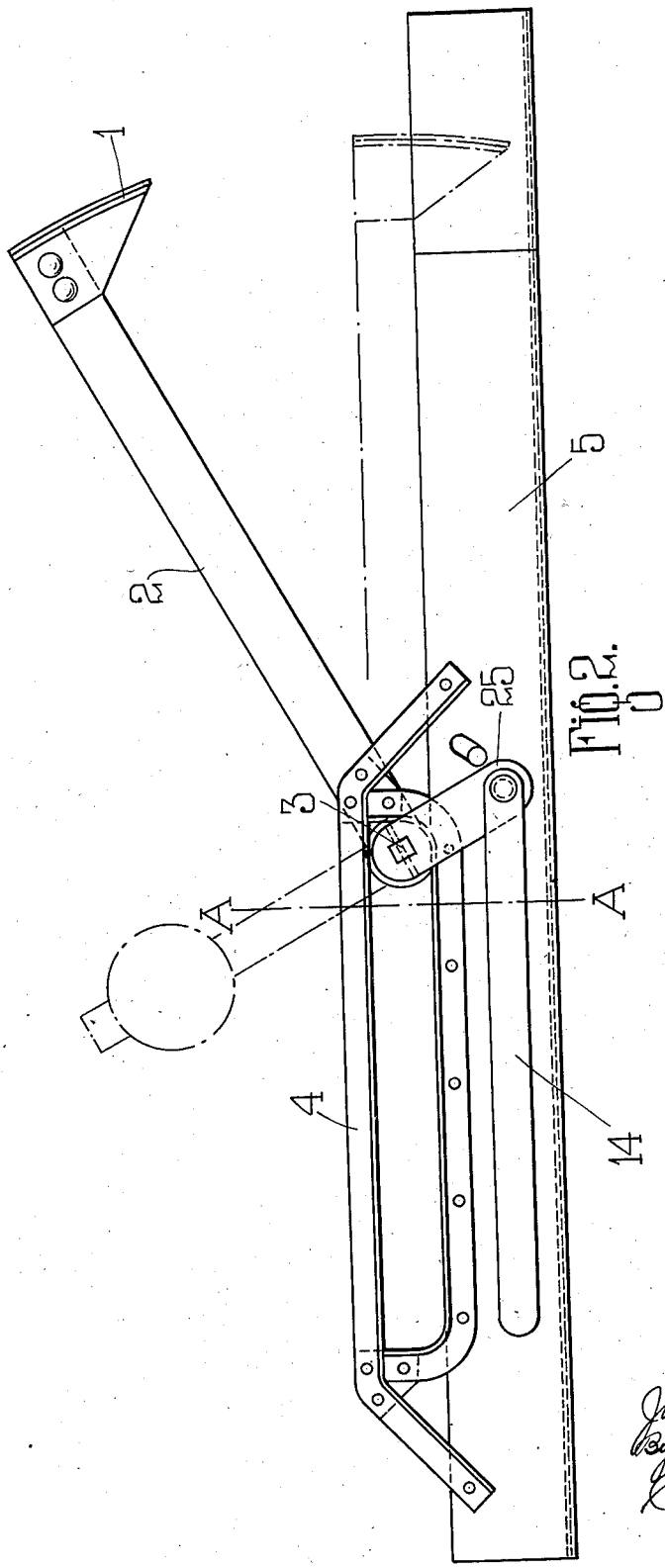

Patented Nov. 12, 1935

2,021,039

UNITED STATES PATENT OFFICE 2,021,039

DEVICE FOR THE HANDLING OF BULK MATERIAL

Joseph Walwyn White, Widnes, England

Application October 5, 1934, Serial No. 747,091
In Great Britain October 5, 1933

1 Claim. (Cl. 198—10)

This invention relates to improvements in devices for the handling of bulk material, such as coal, earth, sand, grain and the like.

According to the present invention a scraper, scoop or the like tool is given a motion in an elliptical or rectangular path, part of which path intersects a heap of material to be displaced whilst another part of said path coincides with or is parallel to the path of a conveyor of any usual type, such as a jigging conveyor, belt conveyor or the like.

The invention is more particularly described with reference to the accompanying drawings in which:—

Figure 1 is a side elevation of one form of construction.

Figure 2 is a side elevation of part of a modified arrangement.

Figure 3 is a corresponding plan view to Figure 2.

Figure 4 is an end sectional view corresponding to Figures 2 and 3 taken on the line A.A.

A scoop or the like tool 1 is mounted on a bell crank lever 2, the pivot 3 of which is adapted to be displaced in guides 4 on a frame 5, which frame forms part of a trough, the front end of the floor of which 6 is formed as a rigid part, which can be embedded into the pile of material to be removed, whilst the remaining part of the floor is formed by means of a belt conveyor 7 passing over guide pulleys 8, 9, one, or both, of which is adjustable for the purpose of tensioning the conveyor 7, and which is driven from any suitable source of power connected to the driving pulley 10. Drive is taken from this pulley 10 by belt, chain, or the like gearing to a pair of sprocket wheels 11 connected to a parallel pair of sprocket wheels 12 by means of a chain 13 to one of the links of which is pivoted a connecting rod 14, the opposite end of which is connected either directly to the pivot 3 of the bell crank lever 2 or to an arm 15 rigid therewith. The second arm 16 of the bell crank lever 2 is adapted to co-operate with the stop 17.

It will consequently be seen that as the sprocket wheels 11, 12 are rotated the connecting rods 14 on either side of the frame 5 will be reciprocated to cause reciprocation of the lever 2 and the scoop 1, from the position shown in full lines in Figure 1 to the position shown in dotted lines in Figure 1, in which position a locking pawl 18 having a catch 18a upon it is freed from a recess 3a in the spindle 3 releasing the scoop 1 and lever 2, so that this may fall by gravity into a load of material adjacent to the end 6 of the trough 5. As the connecting rod 14 then moves backwards a charge of material will be drawn by the scoop 1 up the trough 5 until it is taken up by means of the belt conveyor 7.

As the connecting rod 14 reaches the end of its travel as shown in full lines in Figure 1, the arm 16 on the scoop lever 2 will strike against the stop 17, and raise this lever into the position shown in full lines, in which position it will be locked by means of the pawl 18, which has a catch upon it, engaging as above indicated with a recess in the pivot spindle 3 preventing rotation of this.

The scoop arm 2 may, if desired, be provided as shown with an extension arm 19, although this is not essential, which may have one or more picks or auxiliary scoops 20 arranged to draw the material forward into range of the main scoop 1.

The conveyor 7 may be of any known form. It may be of any desired length, and may work in tandem with other similar conveyors. In the particular arrangement shown, one of its pulleys 9 is supported on an extension 21 of the wheel frame 22, carrying the whole device, so that this end of the belt conveyor 7 is adjustable in angle relatively to the main trough part 5 about the pivot 23, which angularity is adjustable by means of a turn buckle 24.

In the alternative arrangement shown, particularly with reference to Figures 2, 3 and 4, the connecting rod 14 instead of being connected directly to the pivot 3 of the pick or scoop arm 2 is connected to a pivot on the end of an arm 25, rigid with pivot 3 and lever 2, the arm being either counter-weighted as shown in dotted lines, or otherwise mounted to ensure that the scoop 1 on the end of the arm 2 falls into the position shown in dotted lines when the connecting rod 14 reaches the forward end of its travel.

As shown more particularly with reference to Figures 3 and 4, instead of a single scoop 1, this may be made of a number of scoops 26, 27, ... all mounted about the same pivoted spindle 3. These scoops may be independent of one another so that if any one or more are obstructed in their operation the others will continue to function.

The guides 4 in the arrangement described have been shown for purposes of illustration as being parallel to the path of the main conveyor.

It is to be clearly understood that various modifications and changes in the details of construction and arrangement of parts may be made in the device without departing from the scope of the appended claim.

I declare that what I claim is:—

A device for handling bulk material comprising a trough, a pivoted scoop, a bell crank lever carrying the pivot of said scoop, means to displace the pivot of said bell crank lever in a rigid guide path parallel to the floor of said trough, and means to periodically trip the other arm of said bell crank lever to raise the scoop clear of the material at the end of its travel and means to lock the bell crank lever with the scoop in its raised position and means to release said lock at the other end of the travel of the scoop parallel to the trough.

JOSEPH WALWYN WHITE.